United States Patent [19]

Takahashi

[11] Patent Number: 4,703,342
[45] Date of Patent: Oct. 27, 1987

[54] LUMINANCE/CHROMINANCE SEPARATING APPARATUS

[75] Inventor: Hiroshi Takahashi, Tokyo, Japan

[73] Assignee: NEC Corporation, Japan

[21] Appl. No.: 818,552

[22] Filed: Jan. 13, 1986

[30] Foreign Application Priority Data

Jan. 14, 1985 [JP] Japan .................................. 60-4512

[51] Int. Cl.$^4$ .............................................. H04N 9/78
[52] U.S. Cl. ........................................ 358/31; 358/22
[58] Field of Search .................................... 358/22, 31

[56] References Cited

U.S. PATENT DOCUMENTS

| 4,513,311 | 4/1985 | Hirai | 358/31 |
| 4,570,177 | 2/1986 | Kondo | 358/31 |
| 4,591,911 | 5/1986 | Tanaka | 358/31 |

Primary Examiner—Michael A. Masinick
Attorney, Agent, or Firm—Ostrolenk, Faber, Gerb & Soffen

[57] ABSTRACT

A luminance/chrominance separating apparatus for a composite video signal comprises a vertical direction filter section for extracting a delayed chrominance signal and a delayed luminance signal from the composite video signal; a horizontal direction filter section for extracting a non-delayed chrominance signal and a non-delayed luminance signal from the composite video signal; a correlation detector section for detecting a correlation of the composite video signal and producing a gain control signal in response to such detected correlation; and respective gain control circuits for receiving and processing the delayed and non-delayed chrominance and luminance signals in accordance with the gain control signal. In accordance with the gain control signal, complementary gain factors are determined, and applied to the delayed chrominance signal and non-delayed chrominance signal by the respective gain control circuits. The outputs of the gain control circuits are then added to produce chrominance and luminance output signals. The gain factors are selected such that when a correlation of the composite video signal is detected, the output chrominance signal is the delayed chrominance signal; but when no correlation is detected, the output chrominance signal is the non-delayed chrominance signal. The delayed and non-delayed luminance signals are processed in the same way.

9 Claims, 7 Drawing Figures

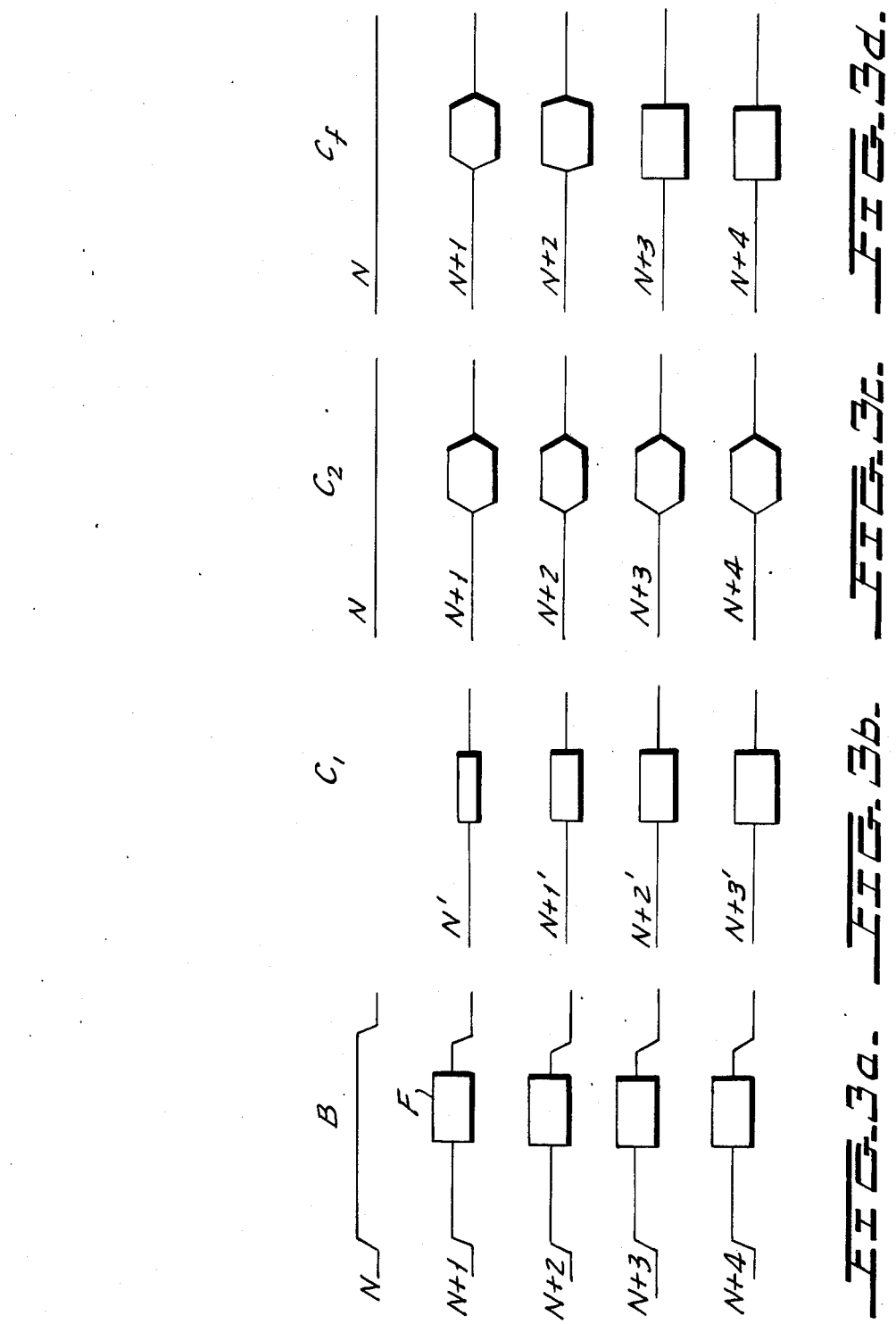

LUMINANCE/CHROMINANCE SEPARATING APPARATUS

BACKGROUND OF THE INVENTION

1. Field of the Invention

This invention relates to an apparatus for separating luminance and chrominance components in a composite video signal, which is suited to be used in a chromakey effect system.

2. Description of the Prior Art

A prior art luminance/chrominance separating apparatus (hereinafter referred to as "Y/C separating apparatus") includes, in combination, a vertical direction filter and a horizontal direction filter. The vertical direction filter performs the separation by utilizing a time-space correlation in the vertical direction of the composite video signal and the phase relationship of a chrominance signal (color subcarrier) between adjacent lines. The horizontal direction filter makes the separation by use of a low pass filter and a subtractor on the basis of the frequency distribution of the liminance and chrominance components of the composite video signal. The separation result obtained by the horizontal direction filter is delayed in order to match its timing with that of the separation result obtained by the vertical direction filter. This is because the vertical direction filter performs a vertical time-space correlation, which requires a delay of at least one horizontal line period. Thus, a time delay is unavoidably exhibited by the overall separation output of the prior art Y/C separating apparatus. Moreover, the prior art device requires a delay circuit for delaying the output of the horizontal direction filter to equalize the timing of the outputs of the two filters. Where the Y/C separation result is used independently of other circuits, no problem arises due to this time delay. However, where the Y/C separation result is to be used for controlling further processing of the video signal from which the Y/C separation has been obtained, it is necessary to provide yet another delay circuit in the transmission line of the video signal in order to compensate for the time delay of the Y/C separation circuit. For example, this problem arises when a chromakey effect is to be performed with a composite video signal, in which case an additional delay circuit is required in the transmission line for the composite video signal.

SUMMARY OF THE INVENTION

Accordingly, it is an important object of the invention to provide a Y/C separating apparatus which can produce an exact and unambiguous Y/C separation result exhibiting a minimum time delay.

Another object of the invention is to provide a Y/C separating apparatus which does not require the above-mentioned delay circuits for the composite video signal and for the output of the horizontal direction filter.

According to the present invention, there is provided a luminance/chrominance separating apparatus for a composite video signal which comprises a vertical direction time-space correlation filter means (for example a vertical direction comb filter) for extracting a delayed chrominance signal and a delayed luminance signal from the composite video signal, a horizontal direction filter means including a low pass filter and a subtractor for extracting a non-delayed chrominance signal and a non-delayed luminance signal from the composite video signal, a correlation detecting means for detecting a correlation of the composite video signal to produce a gain control signal, and a combining means for combining the delayed chrominance signal and the non-delayed chrominance signal and for combining the delayed luminance signal and the non-delayed luminance signal in accordance with the gain control signal.

BRIEF DESCRIPTION OF THE INVENTION

Figure 4:
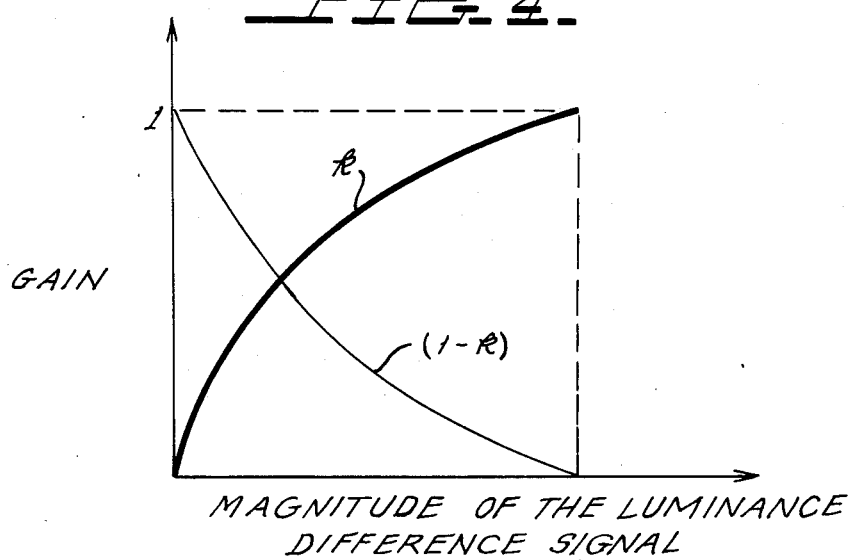
Figure 2:
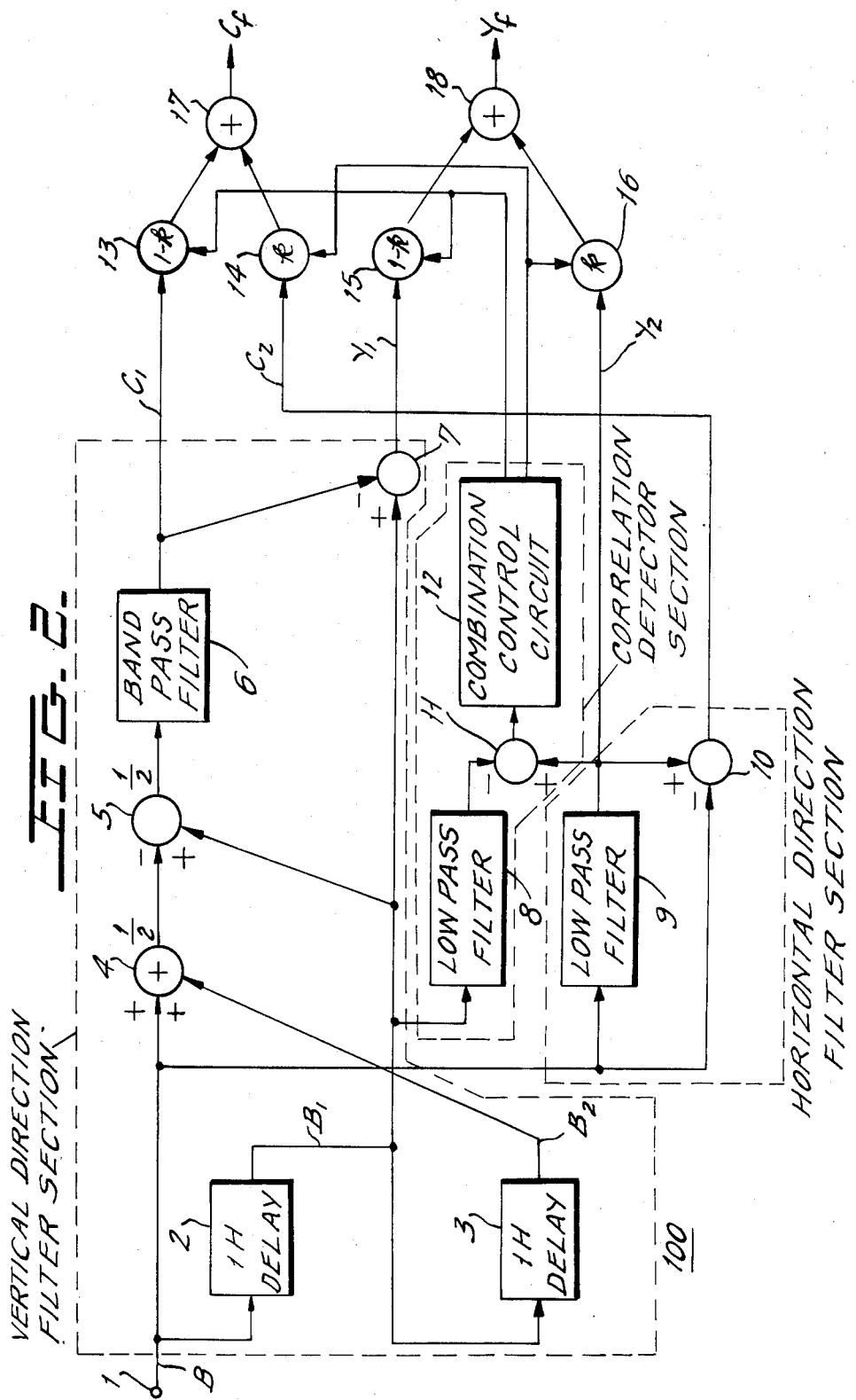
FIG. 2 is a block diagram of an embodiment of a luminance/chrominance separating apparatus according to the present invention.

FIGS. 3(a) to 3(d) are signal waveforms for explaining the embodiment of FIG. 2; and FIG. 4 shows an example of a gain control characteristic which may advantageously be employed in the combination control circuit of FIG. 2.

DESCRIPTION OF A PREFERRED EMBODIMENT OF THE INVENTION

Figure 1:
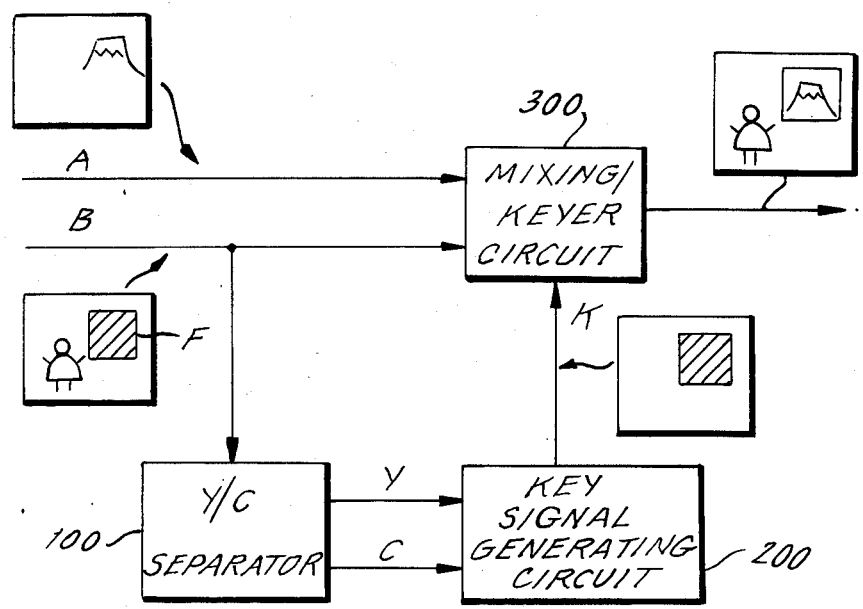
FIG. 1 is a block diagram of an encoded chromakey effect system (such as a line chromakey effect system) to which the invention is effectively applicable.

Referring to FIG. 1, a line chromakey effect system receives a composite video signal A to be inserted into a composite video signal B. The signal B includes an insertion frame F having a predetermined color, into which the signal A is to be inserted. The two signals A and B are applied to a mixing/keyer circuit 300. The video signal B is supplied to a Y/C separator 100, which includes a vertical direction filter and a horizontal direction filter according to the present invention, for separating a luminance signal Y and a chrominance signal C. The separated signals Y and C are supplied to a key signal generating circuit 200 which generates a key signal K, such as a chromakey signal, corresponding to the insertion frame F in the input video signal B. The key signal K is supplied to the mixing/keyer circuit 300 for controlling it to insert part of the video signal A into the insertion frame F of the video signal B.

FIG. 2 shows an example of a Y/C separator 100 according to an embodiment of the present invention. The separator 100 comprises a vertical direction filter section including 1H (one horizontal period) delay circuits 2 and 3, an adder 4, a subtractor 5, a band pass filter 6, and a subtractor 7. The Y/C separator further comprises a horizontal direction filter section including a low pass filter 9 and a subtractor 10. The two filter sections both receive the composite video signal B, which has a waveform as shown in FIG. 3(a), from an input terminal 1. The vertical direction filter section separates a delayed chrominance signal component $C_1$, which has a waveform as shown in FIG. 3(b), and the horizontal direction filter section separates a non-delayed chrominance signal component $C_2$, which has a waveform as shown in FIG. 3(c). As shown in FIG. 3(c), the chrominance signal component $C_2$ obtained through the horizontal direction filter section has no vertical delay, but lacks high frequency components as the result of the characteristic of the low-pass horizontal direction filter. On the other hand, the chrominance signal component $C_1$ obtained through the vertical direction filter section exhibits a vertical delay (at least one horizontal period) but substantially none of its frequency components are absent. Note that in a portion of the video signal B having no correlation in the vertical direction, the amplitude of the chrominance signal component $C_1$ can not be accurately extracted until such a correlation is established. This is shown in lines N' and (N+1)' in FIG. 3(b).

According to the present invention, the signal $C_1$ is used for parts of the video signal B having a high vertical correlation and the signal $C_2$ is used for parts of the video signal B having no vertical correlation. The two signals $C_1$ and $C_2$ are combined in accordance with the degree of correlation, so as to generate an output chrominance signal $C_f$, as shown in FIG. 3(d). Referring to FIG. 3(d), note that the (N+1) line of the output $C_f$ is almost the same signal as shown in FIG. 3(c), since no vertical correlation has been detected. However, a combination of $C_1$ and $C_2$ shown in FIGS. 3(b) and 3(c) is used as the output for the (N+2) line. The signal $C_1$ as shown in FIG. 3(b) is used as the output for the (N+3) line and the succeeding lines. When $C_1$ is used as the output, the contributions from $C_1$ in the (N+2) line, the (N+3) line and the succeeding lines in FIG. 3(d) are delayed by one line as regards their vertical position. However, as indicated above, the object of the invention resides not in the specific content of the video signal but in obtaining an exact Y/C separation result without more than minimum delay, and thus this effect is negligible.

Referring again to FIG. 2 an NTSC composite video signal B is applied to the input terminal 1 and the 1H delay circuits 2 and 3 are connected in series to the input terminal 1. The adder 4 is provided for adding the input composite video signal B and the delayed signal $B_2$ received from the 1H delay circuit 3. The subtractor 5 produces a difference signal wherein the output of the adder 4 is subtracted from the delayed signal $B_1$ received from the 1H delay circuit 2. The band pass filter 6 receives the output of the subtractor 5 and delivers the delayed chrominance signal (i.e., color subcarrier) component $C_1$. A subtractor 7 subtracts the chrominance signal $C_1$ received from the band base filter 6 from the delay signal $B_1$ received from the 1H delay circuit 2 and delivers a delayed luminance signal component $Y_1$. The components designated 1–7 constitute the vertical direction filter section. The chrominance signal $C_1$ and the luminance signal $Y_1$ exhibit a time delay of one horizontal period in comparison with the input video signal B.

Still referring to FIG. 2, the low pass filter 9 receives the input composite video signal B and eliminates the color sub-carrier.

The subtractor 10 receives the input video signal B and subtracts it from the output of the low pass filter 9, to produce another chrominance signal $C_2$ which does not exhibit a time delay. Further, the output of the low pass filter 9 is available as another luminance signal $Y_2$ which has no time delay. The components 9 and 10 constitute the horizontal direction filter section. A correlation detector section will now be described. A low pass filter 8 receives the delayed signal $B_1$ from the 1H delay circuit 2. A subtractor 11 subtracts the output of the filter 8 from the output of the filter 9. This difference signal indicates the amount of luminance difference between lines in the vertical direction and is used for detecting the vertical correlation of the input video signal B. A combination control circuit 12 is responsive to this luminance difference signal to control how the delayed chrominance signal $C_1$ from the band pass filter 6 and the non-delayed chrominance signal $C_2$ from the subtractor 10 are processed and/or combined in the output $C_f$. The circuit 12 also controls the processing and/or combination in the output $Y_f$ of the delayed luminance signal $Y_1$ from the subtractor 7 and the non-delayed luminance signal $Y_2$ from the low pass filter 9.

To combine the delayed and non-delayed chrominance and luminance signals, gain control circuits 13, 14, 15 and 16 are provided. An adder 17 adds a gain-controlled delayed chrominance signal from the gain control circuit 13 and a gain-controlled non-delayed chrominance signal from the gain control circuit 14 to generate an output chrominance signal $C_f$ according to the present invention. On the other hand, an adder 18 adds a gain-controlled delayed luminance signal from the gain control circuit 15 and a gain-controlled non-delayed luminance signal from the gain control circuit 16 to generate an output luminance signal $Y_f$ according to the present invention.

FIG. 4 shows an example of a gain control characteristic which may usefully be employed in the circuits 13–16 according to the present invention. As shown in FIG. 4, the gain k of the gain control circuits 14 and 16 is increased in accordance with the magnitude of the luminance difference signal from the subtractor 11. In this case, the other gain control circuits 13 and 15 have the gain (1-k), which is complementary with respect to the gain (k) of the circuits 14 and 16. Such combination control circuit 12 can be easily constructed by using a read only memory (ROM) which stores date representative of a desired gain characteristic for controlling the circuits 13–16.

The Y/C separating apparatus according to the present invention is suitable for use in the generation of a chromakey signal while minimizing the time delay of the chromakey signal. That is, since in a part of an input video signal having high vertical correlation only a slight change of amplitude and phase occurs in the vertical direction, the ultimate key signal is affected little by such a 1H delay of the output signals. Therefore, the Y/C separation can be made by the vertical direction filter. However, since parts of the video signal having a low vertical correlation exhibit great changes in amplitude and phase in the vertical direction, the ultimate key signal would be subjected to a great phase shift by the vertical direction filter. Therefore, in this case, the Y/C separation should be made by using the horizontal direction filter. Thus, these two filters are selectively employed in accordance with the degree of correlation of the input video signal without requiring additional delay circuits.

Of course, the present invention is not limited by the above-described embodiment, and accordingly may be used with other signals besides the NTSC composite video signal.

As described above, according to the present invention, a Y/C separating apparatus is provided which has both simplified construction and satisfactory operating characteristics for use with the chromakey effect system.

What is claimed is:
1. A luminance/chrominance separating apparatus for a composite video signal comprising:
 a vertical direction filter means for extracting a chrominance component and a luminance component from a composite video signal to produce a first chrominance signal and a first luminance signal;
 a horizontal direction filter means for extracting a chrominance component and a luminance component from said composite video signal to produce a second chrominance signal and a second luminance signal;

a correlation detecting means for detecting a correlation between lines contained in said composite video signal and producing a gain control signal in response to such detected correlation; and a combining means for combining said first and second chrominance signals and for combining said first and second luminance signals in accordance with said gain control signal.

2. A luminance/chrominance separating apparatus as claimed in claim 1, wherein said correlation detecting means includes means for extracting a luminance difference signal between said luminance component from said composite video signal and a luminance component from a delayed composite video signal which is delayed by one horizontal scanning period in comparison with said composite video signal, said gain control signal being related to said luminance difference signal.

3. A luminance/chrominance separating apparatus as claimed in claim 2, wherein said combining means combines said first and second chrominance signals and said first and second luminance signals in accordance with complementary gain factors which depend on a magnitude of said luminance difference signal.

4. An apparatus as in claim 3, wherein a factor (k) is applied to said second chrominance and luminance signals and a complementary factor (1-k) is applied to said first chrominance and luminance signals.

5. An apparatus as in claim 1, wherein said vertical direction filter means comprises first delay means for delaying said composite video signal by one horizontal period;

second delay means receiving the output of said first delay means and delaying same by one additional horizontal period;

a first adder for adding the outputs of said first and second delay means;

a first subtractor for subtracting the output of the first adding means from the output of the first delay means;

a bandpass filter for extracting said first chrominance signal from the output of said first subtracting means; and a second subtractor for subtracting the output of said bandpass filter from the output of said first delay means to produce said first luminance signal.

6. An apparatus as in claim 5, wherein said horizontal direction filter means comprises a first low-pass filter for extracting said second luminance signal from said composite video signal; and a third subtractor for subtracting said composite video signal from the output of said first low-pass filter to produce said second chrominance signal.

7. An apparatus as in claim 6, wherein said correlation detecting means comprises a second low-pass filter for extracting a luminance component from the output of said first delay means;

a fourth subtractor for subtracting the output of said second low-pass filter from the output of said first low-pass filter to produce a luminance difference signal indicative of a correlation of said composite video signal; and a combination control circuit for receiving said luminance difference signal and in response producing said gain control signal.

8. An apparatus as in claim 7, wherein said combination control circuit includes a memory for storing data representative of a predetermined desired relationship of said luminance difference signal and said gain control signal.

9. A chrominance separating apparatus for a composite video signal comprising:

a vertical direction filter means for extracting a chrominance component from a composite video signal to produce a first chrominance signal;

a horizontal direction filter means for extracting a chrominance component from said composite video signal to produce a second chrominance signal;

a correlation detecting means for detecting a correlation of said composite video signal by extracting a luminance difference signal between said composite video signal and a delayed composite video signal and producing a gain control signal in response to said correlation, said correlation being inversely proportional to a level of said luminance difference signal; and a combining means for combining said first and second chrominance signals in accordance with said gain control signal.

* * * * *